United States Patent

Bohlman

[15] 3,657,814
[45] Apr. 25, 1972

[54] TOOL TO CLEAN GRASS AND DIRT FROM AROUND SPRINKLER HEADS

[72] Inventor: Ivan C. Bohlman, 208 North 2nd Avenue, Walla Walla, Wash. 99362

[22] Filed: June 8, 1970

[21] Appl. No.: 44,422

[52] U.S. Cl. ............................................................30/302
[51] Int. Cl. ..............................................................B26b 3/04
[58] Field of Search ...............30/300, 301, 302, 316; 172/13, 172/19

[56] References Cited

UNITED STATES PATENTS

| | | | |
|---|---|---|---|
| 86,045 | 1/1869 | Vaughn | 30/302 X |
| 1,480,151 | 1/1924 | Cosman | 30/316 |
| 1,866,073 | 7/1932 | Aberle | 30/316 X |

Primary Examiner—Theron E. Condon
Assistant Examiner—J. C. Peters
Attorney—Fred C. Matheny

[57] ABSTRACT

The tool comprises a smaller inner tubular member and a larger outer tubular member coaxially positioned to provide an annular space between them and rigidly secured together by inclined or pitched blades. The inner tubular member is of a diameter which adapts it to fit rotatively over a sprinkler head of the type commonly used at about ground level in automatic lawn sprinkler systems. The tool has a handle to be used in applying it to a sprinkler head and in rotatively moving it to clear obstructions which would interfere with spray from the head from a small circular space around the head.

3 Claims, 2 Drawing Figures

PATENTED APR 25 1972 3,657,814

INVENTOR.
Ivan C. Bohlman
BY
Fred C. Matheny
ATTORNEY

TOOL TO CLEAN GRASS AND DIRT FROM AROUND SPRINKLER HEADS

BACKGROUND OF THE INVENTION

The sprinkler heads of automatic sprinkler systems of a type commonly used for lawns, greens, gardens and the like are positioned at about ground level and only at a high enough elevation so water sprayed from them can pass outwardly to irrigate areas close to them. When thus positioned they offer minimum obstruction to the movement of pedestrians and equipment, such as lawn mowers, over them. However, it frequently happens that the spray from these sprinkler heads at about ground level will be interfered with by soil which collects around them or by grass or like vegetation which grows up close to them. When this occurs it is desirable to clear out the spray obstructing material and restore normal operation of the head.

SUMMARY OF THE INVENTION

An object of my invention is to provide a simple, efficient and inexpensive hand tool which can be quickly and easily applird to a sprinkler head positioned at or near ground level and easily operated to clear, by removing or packing down, any dirt, grass or spray obstructing material close to the sprinkler head.

Another object is to provide a tool of this type which can be used on sprinkler heads, particularly on those which are directional in their delivery of spray, without shutting off the water from the sprinkler system of which the head is a part and without danger of getting wet.

Another object is to provide a tool for clearing away spray obstructing materials from an area close to and around a sprinkler head which comprises an inner tubular member of smaller diameter adapted to be lowered over and rotatively moved about a sprinkler head, spaced apart inclined or pitched blades secured to and extending outwardly from said inner tubular member, an outer tubular member of substantially larger diameter rigidly attached to the outer ends of said blades and a handle attached to the just mentioned assembled parts to facilitate handling and imparting rotary movement to them.

Other objects of the invention will be apparent from the following description and accompanying drawings.

BRIEF DESCRIPTION OF THE DRAWINGS

Like reference numerals refer to like parts throughout the drawings.

DESCRIPTION OF THE PREFERRED EMBODIMENT

Figure 1:
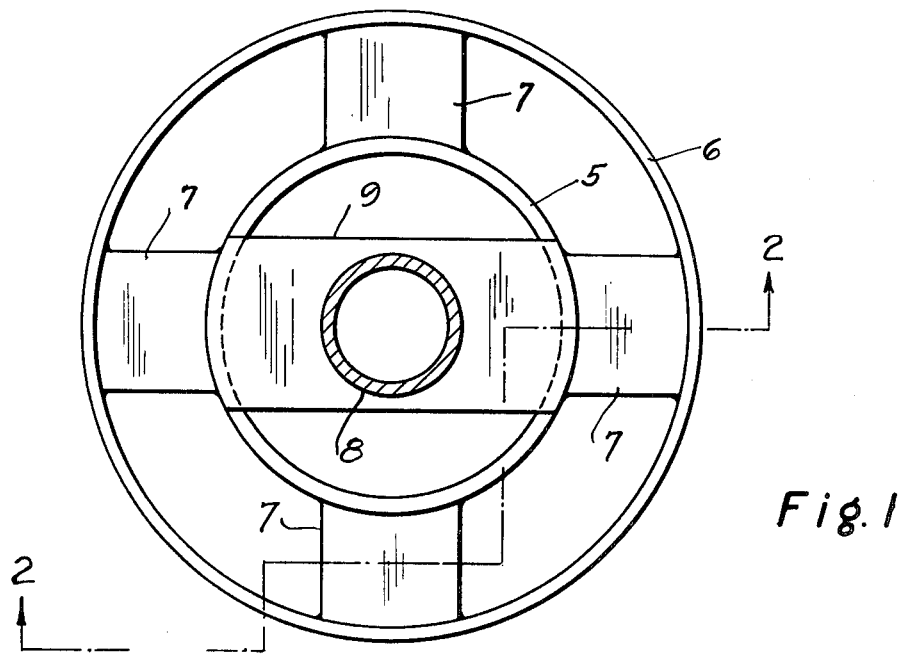
FIG. 1 is a plan view, with parts in section, taken substantially on line 1—1 of FIG. 2, showing a tool embodying my invention.
Figure 2:
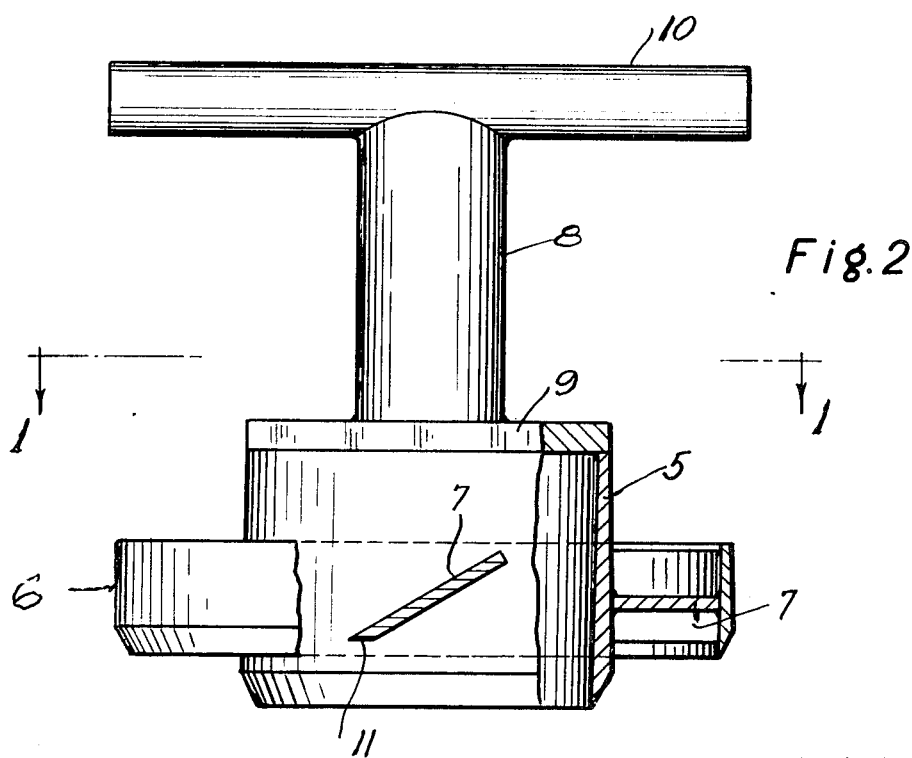
FIG. 2 is a view, partly in elevation and partly in section, taken substantially on line 2—2 of FIG. 1,.

This tool comprises an inner tubular member 5, preferably of cylindrical shape and of the proper diameter so it can be lowered over, and will shield and be guided by, and can be rotatively moved in both directions about a conventional sprinkler head of the type used in automatic lawn sprinkler systems. A larger tubular member 6 is positioned concentrically of and extends around the member 5. The two members 5 and 6 are symmetrically positioned so as to leave an annular space between them and a plurality of inclined or pitched blades 7, each having a sharpened bottom edge 11 are disposed in this annular space. The respective ends of the blades 7 are attached to the members 5 and 6 and the blades and two tubular members thus form a rigid assembly. The tubular member 5 is substantially longer than the tubular member 6 and it extends above the plane of the top edge and below the plane of the bottom edge of said member 6 The annular bottom edges of both of the tubular members 5 and 6 are sharpened, as shown in FIG. 2, so they will cut through grass and other material and can be easily pushed down into the ground if desired. Preferably the outer wall of the inner member 5 is slightly convergent and the inner wall of the outer member 6 is slightly divergent from bottom to top and this provides between said two members 5 and 6 an annular space of upwardly expanding area. Material elevated by the blades 7 moves upwardly more freely and is more easily dumped out of this space because of its upwardly expanding shape. One way to form this upwardly expanding space is to make the walls of both members 5 and 6 thicker at the bottom and thinner at the top as shown in FIG. 2.

For use on conventional sprinkler heads I find it satisfactory to make the inner cylindrical member 5 about 2½inches and the outer cylindrical member 6 from 4 to 5 inches in diameter. Obviously these dimensions can be varied.

A handle 8, which can be of any desired length, is secured by a cross plate 9 to the upper end of tubular member 5 and preferably terminates in a grip member 10 by which rotation can be imparted to the tool.

The inner tubular member 5 is long enough so it will substantially enclose a sprinkler head to which it is applied and cut off the spray from it if it is operating but is short enough so the plate 9 will contact the upper end of a sprinkler head of standard dimensions before the sharpened lower edges of either of the tubular members 5 or 6 can contact the pipes which supply water to said sprinkler head. This prevents injury to the pipes and is desirable where the pipes are made of plastic. Obviously stop means other than plate 9 can be provided. The spray shielding afforded by member 6 makes possible application of the tool to sprinkler heads which are in use without shutting off the water to the entire sprinkler system and without danger of getting wet. This is particularly true of sprinkler heads which are directional and do not deliver a 360° spray.

Ome satisfactory way to use this tool is to place the inner tubular member 5 over a sprinkler head and lower the tool until the sharpened lower ends of both tubular members 5 and 6 are sunk a short distance into the ground and the sharpened lower edges of the blades 7 rest on or are near to the ground. The tubular members 5 and 6 will cut the grass under them when they are pushed down. The tool is then rotatively moved back and forth a few strokes through an angle at least equal to the distance between two adjacent blades. As the tool is moved in one direction the sharp edges 11 of the blades will cut the grass and like vegetation and will tend to dig into the dirt and elevate it and the cut grass and when the tool is rotatively moved in a reverse direction the blades will ride over and press or pack down any cut grass or dirt which slides back off of them. Any material removed with the tool is easily dislodged from it. Thus the tool will clear a small circular area around and close to a sprinkler head and insure normal delivery of spray from the head.

I claim:

1. A tool for displacing spray obstructing material from an area close to and around a sprinkler head which is positioned substantially at ground level, comprising an inner tubular member dimensioned to fit rotatively over the sprinkler head; and outer tubular member of substantially larger diameter than said inner tubular member positioned approximately coaxially of and extending around said inner tubular member, the inner wall of the outer tubular member and the outer wall of the inner tubular member being divergent from each other and providing between them an annular space of upwardly expanding area; a plurality of pitched blades rigid with and extending between said two tubular members, the upwardly expanding space between said two tubular members being open and unobstructed at its upper end and providing for a free discharge of material picked up by said blades; and a handle attached to the assembled tubular members and blades adapted for use in handling and rotatively moving the same.

2. The tool as claimed in claim 1 in which the inner tubular member is relatively short and in which a cross plate is rigid with the upper end of said inner tubular member and serves as a stop in limiting downward movement of the tool over a sprinkler head and in which the handle is rigid with said cross plate and is coaxial with the two tubular members and extends upwardly therefrom.

3. The tool as claimed in claim 1 in which the inner tubular member is substantially longer than the outer tubular member and extends both below the lower edges and above the upper edges of the outer tubular member and blades, said inner tubular member being capable of intercepting outwardly directed spray from a sprinkler head when it is placed over the sprinkler head.

* * * * *